United States Patent [19]
Suzuki et al.

[11] 3,816,290
[45] June 11, 1974

[54] DEVICE FOR ELECTROLYTIC GRINDER

[75] Inventors: Yasuo Suzuki; Tsuneo Oku, both of Yokohama, Japan

[73] Assignee: Hitachi, Ltd., Tokyo, Japan

[22] Filed: Dec. 19, 1972

[21] Appl. No.: 316,513

[30] Foreign Application Priority Data
Dec. 20, 1971   Japan............................ 46-103376

[52] U.S. Cl............. 204/218, 204/129.25, 204/225
[51] Int. Cl............................ B23p 1/04, B23p 1/12
[58] Field of Search .. 204/129.25, 225, 218, DIG. 5

[56] References Cited
UNITED STATES PATENTS
3,004,910  10/1961  Keeleric..................... 204/129.25 X
3,092,710   6/1963  Kiriltsev et al............. 204/129.25 X
3,485,992  12/1969  Sennowitz.................. 204/129.25 X
3,650,938   3/1972  Olton et al........................ 204/218
3,697,403  10/1972  Colwell............................. 204/218

Primary Examiner—F. C. Edmundson
Attorney, Agent, or Firm—Craig and Antonelli

[57] ABSTRACT

An electrolytic grinder in which the feed rate of the worktable is controlled so as to best meet the machining requirements, thereby obviating the problems of a lower machining efficiency and accuracy as well as reduced smoothness of the surface of a workpiece and the short-circuiting between the grinding electrode or wheel and the work piece that might result from the fact that a voltage is applied between the grinding wheel and the work piece.

2 Claims, 4 Drawing Figures

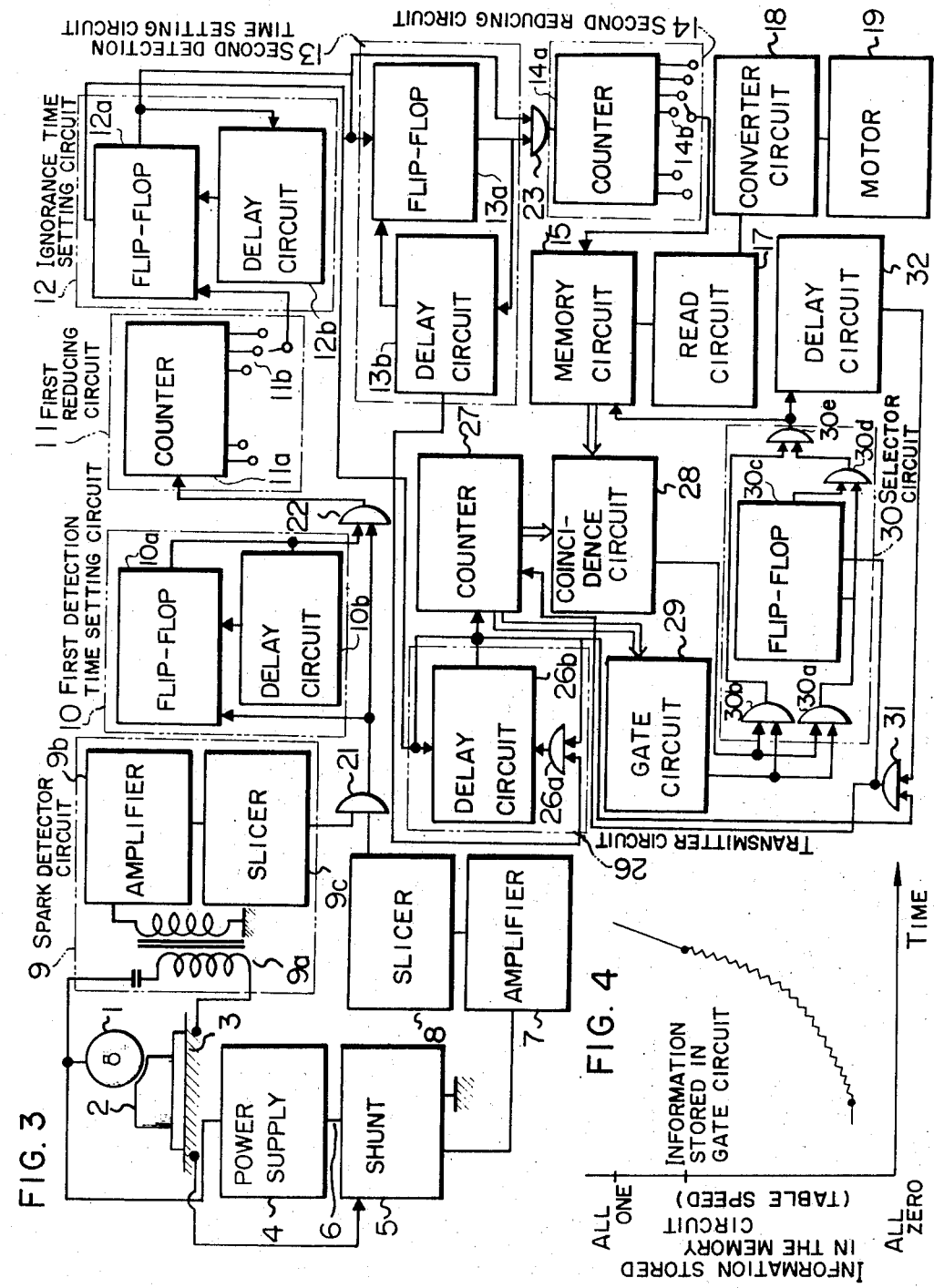

DEVICE FOR ELECTROLYTIC GRINDER

The present invention relates to a feed rate control device for the electrolytic grinder.

The feed rate with which the electrolytic grinder machines a work piece depends upon such factors as the quality of the work piece material, depth of cut and the shape into which the work piece is to be machined. In a conventional device, if sparks are produced during a machining operation, the sparks are usually detected as spark signals by a shunt and an amplifier or a spark detector circuit connected thereto. The spark signals are removed noise and converted to pulse signals by the spark detector circuit. The number of the pulse signals is stored in a memory circuit, so that the information and the content previously stored in the memory circuit corresponding to a predetermined feed rate is reduced by the number of the pulse signals thereby to reduce the feed rate of the table. In the case where the absence of any spark between the grinding electrode and the work piece continues for longer than a predetermined period of time, an acceleration pulse signal is generated by an accelerator circuit and the content corresponding to the accelerated signal is added to the content stored in the memory thereby increasing the feed rate of the table.

It is important here however to determine the critical number of such sparks above which the feed rate of the table is reduced. The critical number is adjustable by changing the detection sensitivity of the spark detector circuit. An apparent number of such sparks observed with a naked eye is usually almost proportional to a number measured by the spark detector circuit, and therefore it is possible to control the number of sparks at a desired number, above which the table feed rate is to be reduced, by adjusting the spark detector circuit, while observing the sparks.

It sometimes happens, however, that the level of the spark signal changes entirely depending on the quality of the material used as a work piece and the shape into which the work piece is to be machined. For example, even if the naked eye detects only one spark, the amplifier or the spark detector circuit may detect 1 to 100 sparks. Thus the controlling of the detection sensitivity by setting a slice level analogically at a constant value poses a problem. As a matter of fact, there is a likelihood of a great number of spark signals being produced at the inception of the machining operation, with the result that the feed speed of the table tends to be reduced unnecessarily or even to zero as soon as the machining operation is started.

Accordingly, it is an object of the present invention to provide a feed rate control device for an electrolytic grinder characterized in that a signal processing circuit is provided for digitally processing the detected spark signals and controlling the spark detection sensitivity, whereby the difficulties due to variation of the spark signal level with the material of the work piece and the shape into which the work piece is to be machined are eliminated for accurate operation of the table feeding system.

In order to achieve the above-mentioned object, the electrolytic grinder according to the invention is such that the sensitivity with which sparks are detected is lowered thereby to prevent a spark from being detected, in the case where a spark is easily generated because of the nature of the material of the work piece or the shape into which the work piece is to be ground or due to the fact that the grinding area and/or electric current required for the grinding operation are smaller than a set value. Also, the present invention is characterized in that the table feed rate is increased or decreased to a level in accordance with the spark generation subsequent to a preset period of time during which any spark is ignored, thereby to achieve optimum grinding conditions.

The above and other objects, features and advantages will be made apparent by the detailed description taken in conjunction with the accompanying drawings, in which:

FIG. 3 is a diagram showing another embodiment of the present invention; and

FIG. 4 is a diagram for explaining the manner in which the table is accelerated.

Figure 1:
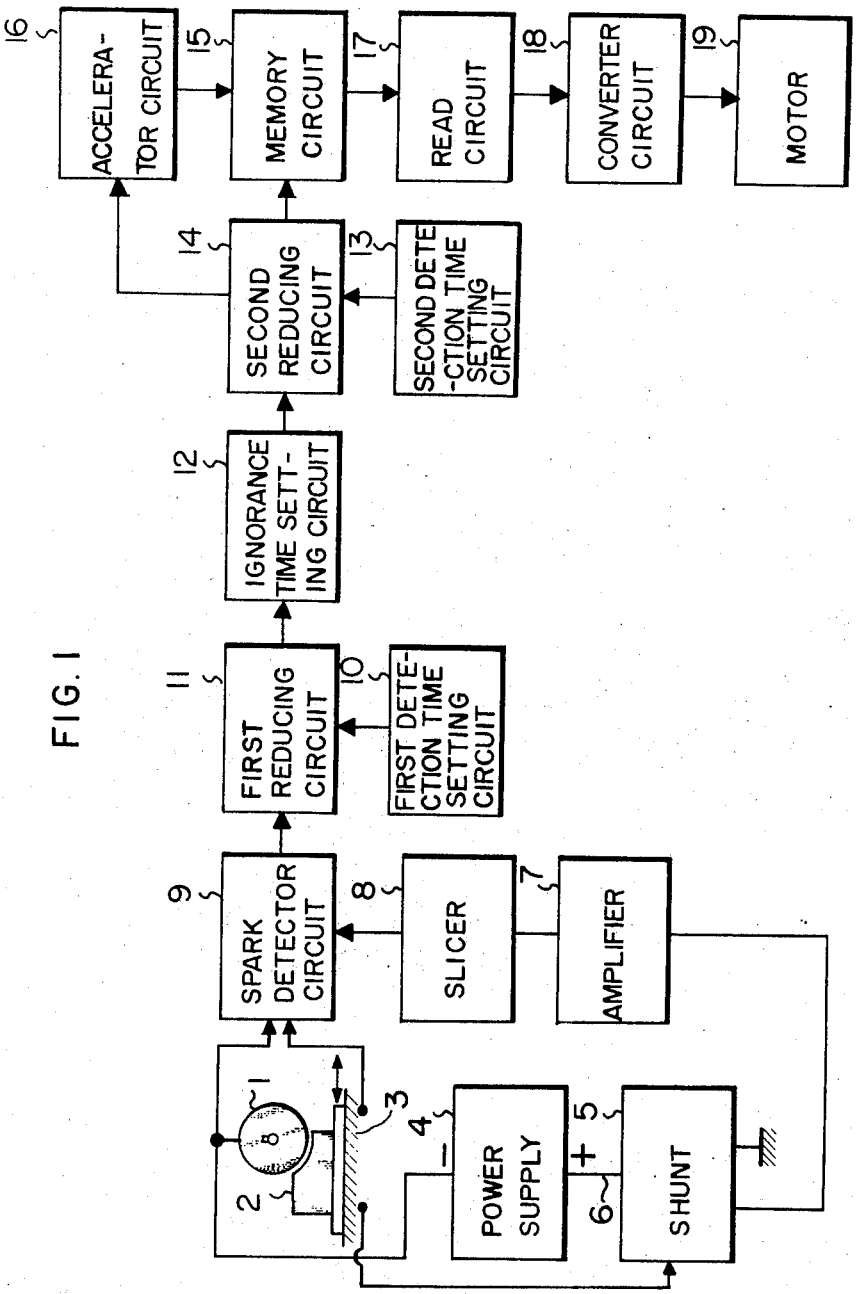
FIG. 1 is a diagram for explaining the fundametal principle on which the electrolytic grinder according to the present invention operates.
Figure 2:
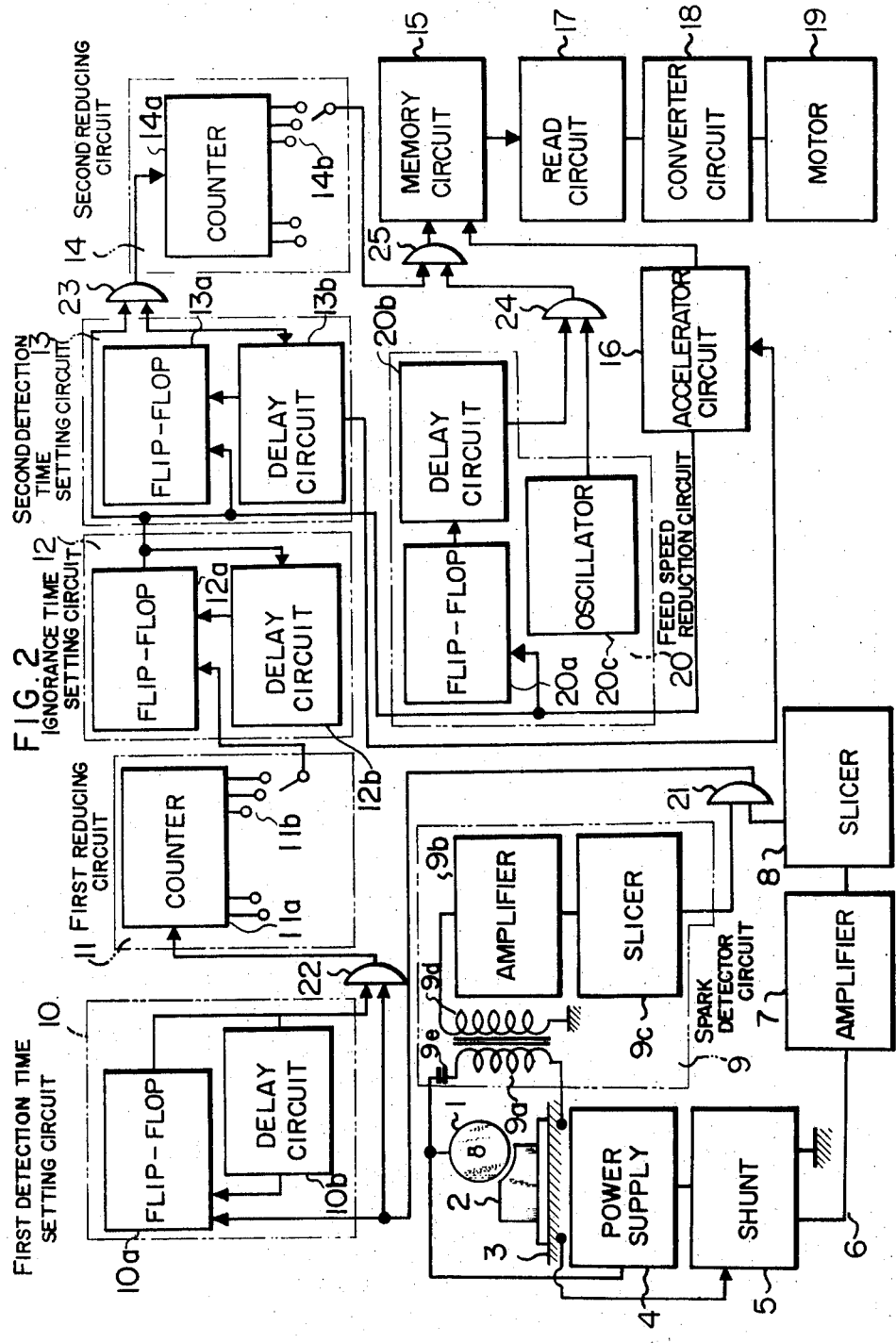
FIG. 2 is a diagram showing an embodiment of the present invention.

Referring to FIGS. 1 to 3, the reference numeral 1 shows a grinding electrode made of graphite with or without grains of grindstone buried therein, the numeral 2 a work piece arranged opposite to the grinding electrode 1, the numeral 3 a worktable on which the work piece 2 is mounted so as to move the work piece 2 toward or away from the grinding electrode 1 in the directions of the arrows and the numeral 4 a power supply for applying a DC or AC current or an AC current superposed on a DC current or a pulse current between the grinding electrode 1 and the work piece 2. In the case where a DC current (in a borad sense of the word) is applied between the grinding electrode and the work piece 2, the positive and negative sides of the power supply 4 are connected respectively with the work piece 2 and the grinding electrode 1. The reference numeral 5 shows a shunt inserted in the line 6 connecting the power supply 4 to the work piece 2 and 7 an amplifier which is connected to the shunt 5 and detectable sparks present between the grinding electrode 1 and the work piece 2 when the amount of current flowing between the grinding electrode 1 and the work piece 2 is relatively small. The reference numeral 7 shows an amplifier connected to the shunt 5, the numeral 8 a slicer connected to the amplifier 7 and adaptable to take out only peak values of the output of the amplifier exceeding a predetermined level thereby to remove noises therefrom. The numeral 9 is a spark detector circuit for detecting spark which may be present between the grinding electrode 1 and the work piece 2 when the amount of current flowing between the grinding electrode 1 and work piece 2 is 20 A or more, the spark detector circuit 9 comprising a resonance circuit 9a, amplifier 9b and a slicer 9c. The reference numeral 10 shows a first detection time setting circuit comprising a flip-flop 10a and a delay circuit 10b for setting the detection time $T_1$ of a first reducing circuit 11 which comprises a counter 11a and a switch contact means 11b and is adaptable to reduce the number $N_1$ of pulse signals transmitted thereto from the spark detector circuit 9 during the period of time $T_1$ set by the first detection time setting circuit 10, to 1/2, 1/4, 1/8, 1/16 . . . . . or $1/2^n$ thereof ($n = 1, 2, 3, 4, \ldots$). The reference numeral 12 shows an ignorance time setting circuit comprising a flip-flop 12a and a delay circuit 12b for setting the time $T_2$ during which any pulse signals which may be sent from the first reducing circuit 11 are ignored, the numeral 13 a second detection time setting circuit comprising a flip-flop 13a and a delay circuit 13b for presetting the detection time $T_3$ of a second reducing circuit 14 which comprises a counter 14a and a switching contact means 14b and is adaptable to reduce the number $N_2$ of signal pulses transmitted thereto from the flip-flop 12a of the ignorance time setting circuit 12 during the time period $T_3$ preset by the second detection time setting circuit 13, to 1/1, 1/2, 1/3, 1/4, 1/5 ...... or $1/n$ thereof ($n = 1, 2, 3, 4, 5 .........$). The reference numeral 15 shows a memory circuit for storing a content relating to the feed rate of the worktable 3. The stored content is subtracted by a content corresponding to the number of pulses which may be detected by the slicer 8 or the spark detector circuit 9 and transmitted thereto through the gate circuit 21, whereas on the other hand a content relating to the number of pulses (a single pulse for the present embodiment) which may be sent from an accelerator circuit 16 is added to the stored content.

Let us assume that the memory circuit 15 has a memory capacity of 6 bits, that the maximum feed rate of the worktable 3 is 6 mm/min, and that the content stored in the memory at the maximum table feed rate is "all one," i.e. (1 1 1 1 1 1) while the content of "all zero," i.e., (0 0 0 0 0 0) represents the zero feed rate. If after the detecting operation by the slicer 8 or the spark detector circuit 9 and the reduction in the pulse number through the first and second reducing circuits 11 and 14 respectively, a signal of 10 pulses appears from the second reducing circuit 14, the content stored in the memory changes from all "one", i.e., (1 1 1 1 1 1), to (1 1 0 1 0 1) whereupon the feed rate is reduced by 60/63 of 1 mm/min. to about 5 mm/min. The reference numeral 16 shows an accelerator circuit for transmitting an acceleration pulse signal to the memory circuit 15 when the second reducing circuit 14 ceases to produce the pulse signal for a predetermined period of time, the numeral 17 a read circuit for reading the content stored in the memory 15, the numeral 18 a converter circuit for converting into DC current and amplifying the read signal from the read circuit 17, the numeral 19 a motor for driving the worktable which rotates at a rate proportional to the level of the voltage of the power transmitted from the converter circuit 18, and the numeral 20 a feed rate reduction circuit comprising a flip-flop 20a, a delay circuit 20b and a pulse generator 20c and adaptable to reduce the feed rate of the worktable sharply to a level determined by the material of the work piece involved, in response to the first detection of sparks by the amplifier 7 or the spark detector circuit 9. For this purpose, the feed rate reduction circuit 20 sends to the memory 15 pulses in the number required for the reduction. This sharp speed reduction is necessary because such work pieces as very hard alloys and silver-tungsten alloy which contain much tungsten or tungsten carbide require a low feed rate. The reference numerals 21, 22, 23, 24 and 25 show gate circuits.

When the power supply 4 begins to operate with a start signal, a DC current or an AC current or a superposition of them or a pulse current is applied between the grinding electrode 1 and the work piece 2, while an electrolytic solution is supplied from an electrolytic solution supply (not shown). At the same time, the content stored in the memory 15, e.g. all "one" is read by the read circuit 17, which content is converted into DC current and amplified by the converter circuit 18. This current is used to drive the feed motor 19 thereby to feed the worktable at a feed rate corresponding to the content (1 1 1 1 1 1) stored in the memory, i.e., at its maximum rate in such a direction as to cause the work piece 2 to approach the grinding electrode 1. When the worktable 3 reaches a point where the grinding electrode 1 faces closely to the work piece 2, an electric current flows between the grinding electrode 1 and the work piece 2 through the electrolytic solution, whereby the grinding operation is started.

The operation of controlling the feed rate of the worktable will be now explained.

A.

In the case where a spark or sparks are generated between the grinding electrode 1 and the work piece 2 at, or just after the beginning of the grinding operation or in the middle of the grinding operation:

1. A spark or sparks are detected by the amplifier 7 or the resonance circuit 9a of the spark detector circuit 9 and noises included in the spark signal are removed, followed by the transformation of the spark signal into a pulse signal including a train of pulses which are applied to the gate circuit 21.
2. The pulse signal transmitted through the gate circuit 21 is applied to the gate circuit 22 which permits the pulse signal to pass therethrough to the first reducing circuit 11 for the time period $T_1$ preset by the first detection time setting circuit 10.
3. The number of pulses $N_1$ applied to the first reducing circuit 11 is reduced by that circuit to $1/2^n$ thereof, and the reduced number of pulses are applied to the ignorance time setting circuit 12.
4. The ignorance time setting circuit 12 functions in such a manner as to cut off a part of the pulses which may be applied to it from the first reducing circuit 11 during the ignorance time period $T_2$ that is the period of time preset by the ignorance time setting circuit 12, while passing to the second detection time setting circuit 13 the remaining part of the pulses as may be applied thereto from the first reducing circuit 11 after the time period $T_2$.
5. The second detection time setting circuit 13 so functions as to pass to the second reducing circuit 14 through the gate circuit 23 such pulses as may be applied to the second detection time setting circuit 13 from the ignorance time setting circuit 12 during the time period $T_3$ preset by the circuit 13.
6. The second reducing circuit 14 so functions as to reduce the number of pulses transmitted through the gate circuit 23 to $1/n$ thereof, the resulting number $N_3$ being $N_1$ detected by the shunt 5 or the resonance circuit 9, multiplied by $1/2^n \cdot 1/n$.
7. The pulse signals resultant from the reduction by the second reducing circuit 14 are applied through the gate circuit 25 to the memory circuit 15 thereby to reduce the content (1 1 1 1 1 1) stored therein by a content corresponding to the number $N_3$. Assuming, for example, that the number of pulses $N_3$ sent from the second reducing circuit 14 to the memory circuit 15 is 10 and the content stored in the memory circuit 15 is all "one" (1 1 1 1 1 1) at the table feed rate of 6 mm/min, the content stored in the memory 15 changes from all "one" (1 1 1 1 1 1) to (1 1 0 1 0 1), whereupon the table feed rate is reduced by 60/63 mm/min to about 5 mm/min.

B.

In the case where no spark is generated between the grinding electrode 1 and the work piece 2:

1. A start signal for starting the accelerator circuit 16 is applied from the second detection time setting circuit 13 to the accelerator circuit 16 when the time period during which no spark is generated between the grinding electrode 1 and the work piece 2 exceeds a predetermined period of time.
2. In response to the start signal, the accelerator circuit 16 transmits to the memory circuit 15 accelerating signals at the rate of one signal for a predetermined period of time and as a result the content stored therein is increased by one each accelerating signal, whereby, the feed rate of the worktable is increased by about 6/63 mm/min.

Another embodiment of the present invention is shown in FIG. 3, in which the reference numeral 26 shows a circuit for transmitting a pulse signal in response to a start signal applied to the gate circuit 26a. Such pulse signal includes a number of pulses whose number or frequency per unit time is adjustable. The reference numeral 27 shows a counter for counting the number of the pulses transmitted from the transmitter circuit 26, the numeral 28 a coincidence circuit for producing a single pulse when a complement of the number counted by the counter 27 coincides with the content stored in the memory circuit 15, the numeral 29 a gate circuit for passing one of the pulses derived from the counter 27 when the count by the counter 27 reaches a predetermined number, say, 20, the numeral 30 a selector circuit comprising gate circuits 30a, 30b, 30d and 30e, and a flip-flop 30c for passing and applying to the memory circuit 15 one of the pulses sent from the coincidence circuit 28 and the gate circuit 29, respectively, whichever arrives later, the numeral 31 a gate circuit and the numeral 32 a delay circuit for slightly delaying the signal from the selector circuit 30 and passing it through the gate circuit 31 to the counter 27 thereby to clear it of the content stored therein. The other component elements are the same as those included in the preceding embodiment and are marked with the same reference numerals.

Because of the above-mentioned construction, the content stored in the memory circuit 15 is changed (addition is made thereto) in the following order of steps when the absence of a spark between the grinding electrode 1 and the work piece 2 continues for more than a predetermined period of time:

1.

A start signal is transmitted from the second detection time setting circuit 13 to the pulse transmitter circuit 26.

2.

The pulse transmitter circuit 26 sends out a pulse signal of a predetermined frequency on receipt of the start signal from the second detection time setting circuit 13.

3.

The pulses transmitted from the pulse transmitter circuit 26 are counted by the counter 27.

4.

A single pulse is transmitted from the coincidence circuit 28 to the selector circuit 30 when the complement of the count number of the counter 27 agrees with the content stored in the memory circuit 15, while when the content stored in the counter 27 coincides with the content stored in the gate circuit 29, another pulse is applied through the gate circuit 29 to the selector circuit 30.

5.

The selector circuit 30 so functions as to pass to the memory circuit 15 one of the pulses applied thereto from the coincidence circuit 28 and the gate circuit 29, whichever arrives later, thereby to make an addition of one increment to the content stored in the memory 15. The pulse signal which, on the one hand, is applied to the memory circuit 15, on the other hand, is delayed slightly by the delay circuit 32 and sent through the gate circuit 31 to the counter 27, thereby to clear the counter 27 of the content stored therein.

Which pulse arrives at the selector circuit 30 later, the pulse from the coincidence circuit 28 or the one from the gate circuit 29, depends upon the contents stored in the memory 15 and the gate circuit 29. For example, if the content preset in the gate circuit 29 is (0 1 0 1 0 0) (corresponding to the twentieth pulse counted by the counter 27), the pulse signal from the coincidence circuit 28 arrives at the selector circuit 30 later than the one from the gate circuit 29 in the range of (1 0 1 0 1 0) to (0 0 0 0 0 0) of the content of the memory circuit 15 (corresponding to 21 to 63 pulses counted by the counter). In this case, each time an addition of one is made to the content stored in the memory 15, the complement of the content stored in the counter 27 is reduced accordingly, resulting in a shorter time required for the agreement of the content stored in the memory 15 with the reverse of the content stored in the counter 27. In other words, by such additions, the content stored in the memory 15 changes non-linearly with respect to time as shown in FIG. 4.

On the other hand, when the content stored in the memory 15 is in the range from (1 1 1 1 1 0) to (1 0 1 1 0 0) (corresponding to 1 to 19 pulses counted by the counter 27), the pulse from the gate circuit 29 is applied to the selector circuit 30 later than the pulse from the coincidence circuit 28. In this case, each time 20 pulses are counted by the counter 27, a pulse of acceleration signal is applied to the memory 15 and therefore the additions change the content stored in the memory 15 linearly with respect to time as shown in FIG. 4.

It will be seen from the above description that the device according to the present invention has the following advantages:

1.

Provision of the ignorance time prevents the feed rate of the worktable from remaining at zero or an exceptionally low level.

2.

Since pulses representing any spark which may be detected by the shunt and the spark detector circuit are reduced by the reducing circuit, the table feed rate can be reduced in accordance with the number of sparks generated, thereby preventing the short-circuiting between the grinding electrode and the work piece.

3.

The time required for making one addition to the content stored in the memory circuit 15 becomes shorter as it approaches all "one" (1 1 1 1 1 1) or all "zero" (0 0 0 0 0 0). That is to say, the time required for increasing the feed rate of the worktable is decreased with the increase of the feed rate of the worktable. As a result, the feed rate of the worktable rises at a lower rate at a lower table feed rate where many sparks tend to occur than at a higher table feed rate where less sparks occur. Therefore, it is possible to maintain the feed rate of the worktable at a level immediately before the generation of a spark between the grinding electrode and the work piece regardless of the work piece, working area and the shape of the working surface, resulting in an extremely high operating efficiency.

4.

To achieve an especially low grinding speed required of work pieces of certain materials, the table feed rate is adapted to be reduced sharply in response to the first spark that may be generated, and as a result any material which contains much tungsten or tungsten carbide can be ground without any short-circuit troubles.

Instead of providing a worktable of which the feed rate is made controllable as in the abovedescribed embodiments, the grinding electrode may alternatively be rendered movable to achieve the same advantages.

What is claimed is:

1. A feed rate control device for an electrolytic grinder comprising a spark detector circuit for detecting sparks generated between a grinding electrode and a work piece and producing a pulse signal in response to the generation of said spark, a reducing circuit for producing the number of pulses equal to the difference between the number of all pulses included in said pulse signal produced by said spark detector circuit and the number of pulses produced by said spark detector circuit for a predetermined period of time, an ignorance time setting circuit for presetting a time period during which the working area and/or the amount of working current is smaller than a predetermined value or during which the work piece tends to generate a spark, an accelerator circuit for producing an acceleration pulse signal only when no signal is produced by said reducing circuit even after a predetermined period of time, a memory circuit for memorizing the feed rate of the worktable in accordance with the acceleration pulse signal from said accelerator circuit and the pulse signal from said reducing circuit, a read circuit for reading the content stored in said memory circuit, a circuit for converting a signal from said read circuit into a DC voltage and a drive motor which rotates at a rate proportional to the magnitude of the DC voltage sent from said converter circuit.

2. A feed rate control device for an electrolytic grinder comprising a spark detector circuit for detecting a spark generated between a grinding electrode and a work piece and producing a pulse signal in response to the generation of said spark, a reducing circuit for producing the number of pulses equal to the difference between the number of all pulses included in said pulse signal produced from said spark detector circuit and the number of pulses produced by said spark detector circuit for a predetermined period of time, an ignorance time setting circuit for presetting a time period during which the working area and/or the amount of working current is smaller than a predetermined value or during which the work piece tends to generate a spark, an accelerator circuit for producing an acceleration pulse signal only when no signal is produced by said reducing circuit even after a predetermined period of time, a circuit for sharply reducing the feed rate of the worktable to a relatively low level in response to the first spark detected by said spark detector circuit in the case where a work piece of such material as a very hard alloy or silver-tungsten alloy requires a very low feed rate compared with the maximum feed rate, a memory circuit for memorizing the feed rate of the worktable in accordance with the acceleration pulse signal from said accelerator circuit and the pulse signal from said reducing circuit, a read circuit for reading the content stored in said memory circuit, a circuit for converting a signal from said read circuit into a DC voltage and a drive motor which rotates at a rate proportional to the magnitude of the DC voltage sent from said converter circuit.

* * * * *